United States Patent
Rueb

(10) Patent No.: US 9,881,383 B2
(45) Date of Patent: Jan. 30, 2018

(54) LASER PROJECTION SYSTEM WITH MOTION COMPENSATION AND METHOD

(71) Applicant: Virtek Vision International Inc., Waterloo (CA)

(72) Inventor: Kurt D. Rueb, Kitchner (CA)

(73) Assignee: VIRTEK VISION INTERNATIONAL ULC, Waterloo, ON (CA)

(*) Notice: Subject to any disclaimer, the term of this patent is extended or adjusted under 35 U.S.C. 154(b) by 185 days.

(21) Appl. No.: 14/160,945

(22) Filed: Jan. 22, 2014

(65) Prior Publication Data
US 2014/0210996 A1    Jul. 31, 2014

Related U.S. Application Data

(60) Provisional application No. 61/757,412, filed on Jan. 28, 2013.

(51) Int. Cl.
*G06T 7/20* (2017.01)
*G06T 7/73* (2017.01)

(52) U.S. Cl.
CPC ............ *G06T 7/2093* (2013.01); *G06T 7/73* (2017.01)

(58) Field of Classification Search
CPC ....................................................... G06T 7/73
See application file for complete search history.

(56) References Cited

U.S. PATENT DOCUMENTS

| 5,491,510 | A | 2/1996 | Grove |
| 5,646,859 | A | 7/1997 | Petta et al. |
| 5,870,136 | A | 2/1999 | Fuchs et al. |
| 6,006,126 | A | 12/1999 | Cosman |
| 6,554,431 | B1 | 4/2003 | Binsted et al. |
| 7,292,269 | B2 | 11/2007 | Raskar et al. |
| 2005/0058332 | A1* | 3/2005 | Kaufman ............... G03B 35/00 382/133 |
| 2005/0082262 | A1* | 4/2005 | Rueb ....................... B25H 7/00 219/121.6 |
| 2006/0016957 | A1* | 1/2006 | Hofmann ............... B28D 1/043 250/201.1 |

(Continued)

FOREIGN PATENT DOCUMENTS

| EP | 1107052 A1 | 6/2001 |
| WO | 2012136345 A2 | 10/2012 |

*Primary Examiner* — Hung Dang
*Assistant Examiner* — Sunghyoun Park
(74) *Attorney, Agent, or Firm* — Warner Norcross & Judd LLP

(57) ABSTRACT

A method of accurately projecting a laser image pattern on a work surface and continuously compensating for relative dynamic movement between the laser and the work surface, including establishing a position of the camera in three dimensions relative to the work surface by locating the targets in the camera image, establishing a position of the laser relative to the work surface utilizing the fixed position of the laser relative to the camera, and using a computer to continuously adjust the rotation of the laser projector mirrors in response to dynamic movement of the laser projector relative to the work surface as determined by the camera. In one embodiment, the computer continuously tracks at least two prior locations of the laser projector relative to the work surface and predicts the next location of the laser, compensating for movement of the laser relative to the work surface.

15 Claims, 2 Drawing Sheets

(56) References Cited

U.S. PATENT DOCUMENTS

| | | | |
|---|---|---|---|
| 2006/0235849 A1 | 10/2006 | Schmidt et al. | |
| 2007/0100492 A1* | 5/2007 | Idaka | G05B 19/4086 700/166 |
| 2008/0310757 A1* | 12/2008 | Wolberg | G06K 9/00208 382/285 |
| 2009/0080036 A1* | 3/2009 | Paterson | G01B 11/2518 358/474 |
| 2011/0050872 A1* | 3/2011 | Harbert | G01N 33/12 348/61 |
| 2011/0135190 A1* | 6/2011 | Maad | A61B 6/0407 382/154 |
| 2012/0155751 A1* | 6/2012 | Aoba | G06T 7/00 382/159 |

\* cited by examiner

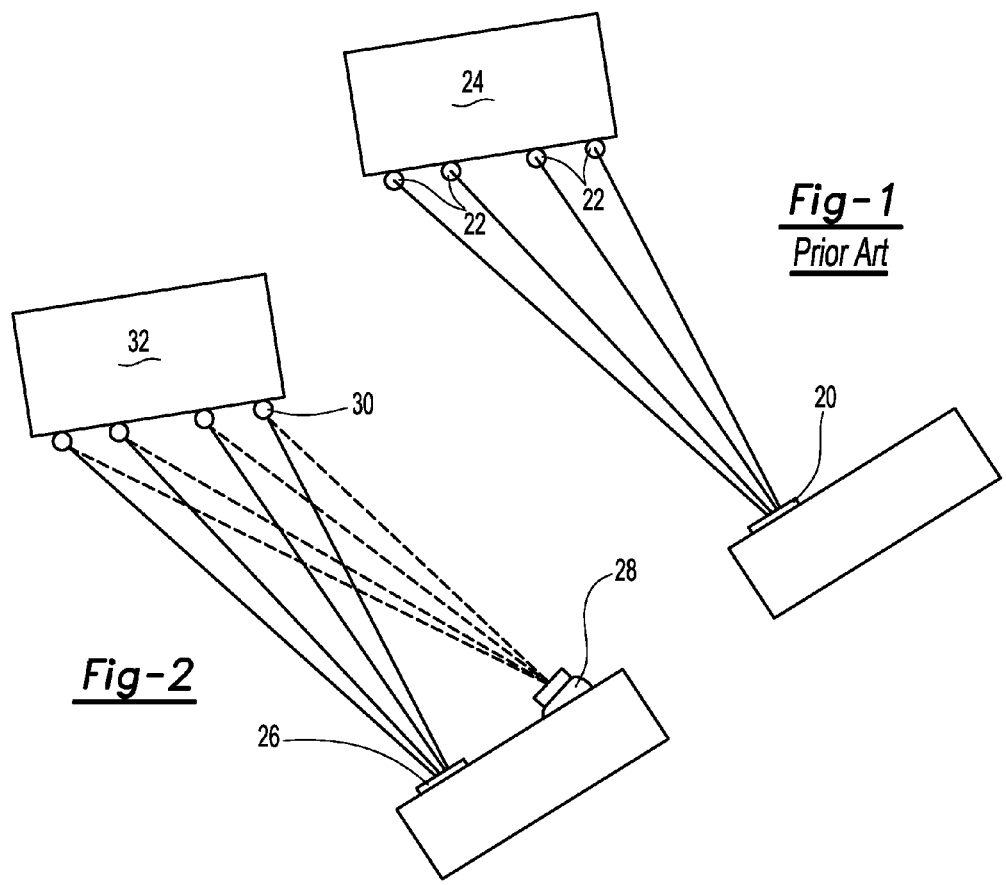
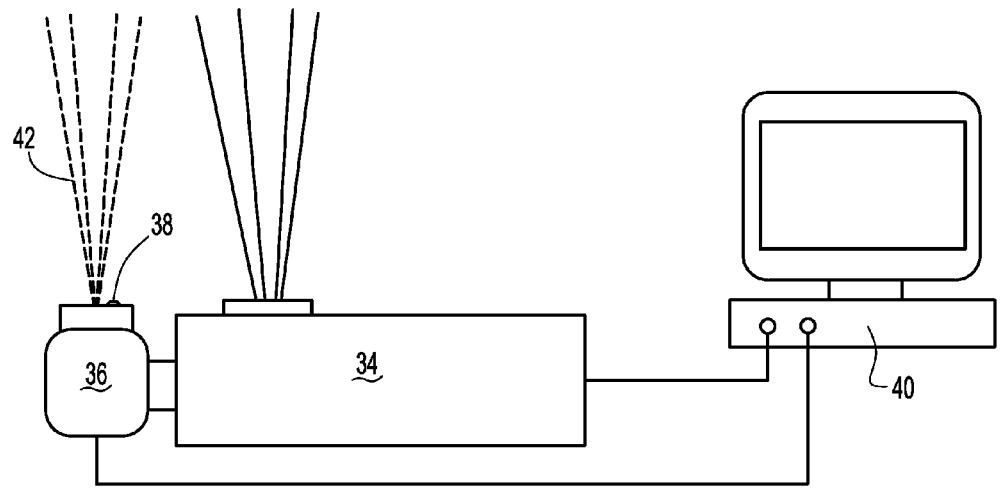

LASER PROJECTION SYSTEM WITH MOTION COMPENSATION AND METHOD

RELATED APPLICATIONS

This application claims priority to provisional patent application Ser. No. 61/757,412 filed Jan. 28, 2013.

FIELD

This application relates to a method of accurately projecting a laser image on a target or work surface and continuously compensating for relative dynamic movement between the laser projector and the target's surface.

BACKGROUND

At present, laser projectors are utilized for assembly of components on a work surface, such as the assembly of components of a truss as disclosed, for example, in my U.S. Pat. No. 5,646,859. At least four targets, typically retro-reflective targets, are fixed relative to the work surface and a laser projector periodically scans the targets to calibrate the relative position between the work surface and the laser projector. This is presently achieved by measuring the target coordinates relative to the coordinate system of the tool and then locating the position of the projector relative to the tool by a process of resection (calculating the position of the projector where the known laser rays to the target pass through the known 3-D target coordinates). Once the relative position of a laser projector is established, the required deflection angle of the laser projector scanning minors can be calculated to trace the laser spot through the desired template pattern on the known three dimensional profile of the tool or work surface. The template pattern is projected as a series of vector movements with the laser sequentially tracing through the features of the pattern. If the trace through the pattern features occurs with sufficient frequency, the pattern may be displayed without visible flicker artifacts.

The precise location of the retro-reflective calibration targets is established by scanning the laser spot in a grid pattern over the surface of the target. Locating the position of four or more targets allows the calibration of the relative projector position. In the traditional process, a host computer calculates the projector location and required scanning vector mirror movements to trace through the defined 3-D template pattern, and then transmits the resulting vector display list of two axis scanning mirrors' movements to an imbedded computer in the projector which continually retraces the desired scanning sequence. Periodically, the scanning sequence is stopped and a target is located to check for variations in the projected pattern location due to a change in the position of the projector relative to the target or tool surface or to compensate for other factors, such as drift due to temperature variations in the environment. If a variation is detected, the targets are relocated and a new scanning sequence is calculated and transmitted to the projector.

However, scanning the target positions with the projector must be performed sequentially and, at most, a few targets may be scanned per second. As a result, tests for projection drift can only be performed intermittently and correction of the projector pattern results is a noticeable interruption in the projected pattern. While this traditional method can compensate effectively for slow-changing environmental conditions or intermittent occurrences, such as deliberate repositioning of the target or tool surface, it cannot correct for more dynamic changes, such as vibration in a ceiling mounted laser projector as loading cranes are moved or as a building movement occurs in response to air pressure variations due to wind gusts or opening of a loading bay door.

The prior art does include proposals for compensating for movement of a projector relative to a target surface using a camera to acquire the pose of the system relative to a target's surface. Using a camera to perform the tracking of the projector has two important advantages, namely (i) modern cameras can operate at high speed, locating targets hundreds of times per second, and (ii) target detection is independent of projection and does not interfere with the dynamic motion of the projected image. Generally, however, the projector disclosed in the prior art is a video projector (i.e., displaying raster images at a fixed refresh rate, such as 30 or 60 frames per second). In contrast, the method of this invention corrects for a dynamically displayed vector image produced by a scanning laser. While the entire laser pattern may only be refreshed more slowly (e.g., 40 times per second), the individual points traced are updated more than 10,000 times per second as discussed further below. One exception is disclosed in published PCT Application WO 201213645 of Keitler, et al which states that the disclosed dynamic tracking method may be used for either video or laser projectors; however, the disclosed method relies upon unique configured targets which have not proven feasible commercially, particularly for laser projectors.

SUMMARY

The method of accurately projecting a laser image pattern on a target or work surface and continuously compensating for relative dynamic movement between the laser projector and the work surface includes a laser projector and camera system having at least one laser projector having a source of a laser beam and rotating mirrors redirecting the laser beam onto the work surface, at least one high resolution camera fixed relative to the laser projector, targets at fixed locations relative to the work surface and a computer communicating with the laser projector and the camera. The method of this invention then includes establishing a position of the camera in three dimensions relative to the work surface by locating the targets in the camera image. The method then includes establishing a position of the laser projector relative to the work surface utilizing the fixed position of the laser projector relative to the camera. In one preferred embodiment, the method of this invention then includes using the computer to continuously adjust the rotation of the laser projector mirrors in response to dynamic movement of the laser projector relative to the work surface as determined by the camera, continuously correcting the location of the laser beam on the work surface. In one preferred embodiment, the method of this invention includes using the computer to continuously track at least two prior locations of the laser projector relative to the work surface in three dimensions and predicting the next location of the laser projector, the computer thereby compensating for movement of the laser projector relative to the work surface; that is, the relative velocity of the laser projector relative to the work surface. The acceleration (i.e., the changes in velocity) of the laser projector relative to the work surface in three dimensions may also be determined by continuously tracking at least three prior locations of the laser projector relative to the work surface then predicting the next location of the laser projector compensating for acceleration of the laser projector relative to the work surface.

The method of this invention may include establishing the position of the camera relative to the laser projector by first scanning the targets with the laser projector and then locating the targets with the camera when the laser projector is stable relative to the targets. The targets may be retro-reflective targets and the system may include a light flash assembly, such as an LED strobe assembly, when the method includes directing the light flashes toward the retro-reflective targets and locating the lighted retro-reflective targets with the camera to very accurately locate the retro-reflective targets and the targets' surface relative to the laser projector and camera system. As set forth above, the targets are at fixed locations relative to the work surface and in this embodiment emit or reflect a source of light. The method of this invention may also include determining the position of the laser projector relative to the work surface by utilizing the computer to convert three dimensional pattern coordinates to project vector mirror definition coordinates in the laser projector as the corrected pattern is traced on the work surface. The method of this invention may also include directly observing with the camera an element of the laser projector, such as a spot or a series of spots projected by the laser projector and calculating the position of the camera relative to the laser projector with the computer.

As will be understood from the above description of the method of this invention, the method of this invention is particularly suitable for accurate assembly of components, such as assembly of aircraft carbon fiber layout requiring an accuracy of at least 0.50 mm (0.0197 in.) under dynamic conditions. As set forth above, laser projection refreshes the individual points traced in the pattern more than 10,000 times per second. So, by warping within each pattern instead of between patterns, it is possible with the method of this invention to correct with much more fidelity (e.g., if the projection must be corrected for movement of 50 cm/second, a 50 Hz correction produces a 1 cm error in the pattern while 10,000 Hz corrects to 0.005 cm (or about 0.002 in.) which is an imperceptible error and can be used for precise assembly tasks such as aircraft carbon fiber layup. "Warping" is correcting for 3-D perspective, stretching for two dimensions. Dynamically locally correcting the traced laser projector vector pattern is an important feature of this invention.

As set forth above, dynamic tracking is an important feature of this invention; that is, the method of this invention fits the relative movement of the laser projector and the work surface to the measurement, described as a function of time and then predicts where the object will be at the precise instant in the future when the correction is actually applied to the projected display (e.g. to correct for processing delays of a few milliseconds). This allows for most natural movements where the forces applied are reasonably continuous. However, if the relative movement hits a fixed object, it will stop instantly and the projected pattern will "bounce" past the position for a few thousandths of a second.

Other advantages and meritorious features of the method of accurately projecting a laser image pattern on a work surface of this invention will be more fully understood from the following description of the preferred embodiments of this invention. As will be understood, however, this method is not limited to the embodiments described except as set forth in the appended claims.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a schematic view of the prior art commercial method of projecting a laser template on a work surface;

FIG. 2 is a schematic view of an improved method of accurately projecting a laser image;

FIG. 3 is a schematic illustration of a further improvement to the method of projecting a laser image;

DESCRIPTION OF THE EMBODIMENTS

Figure 4:
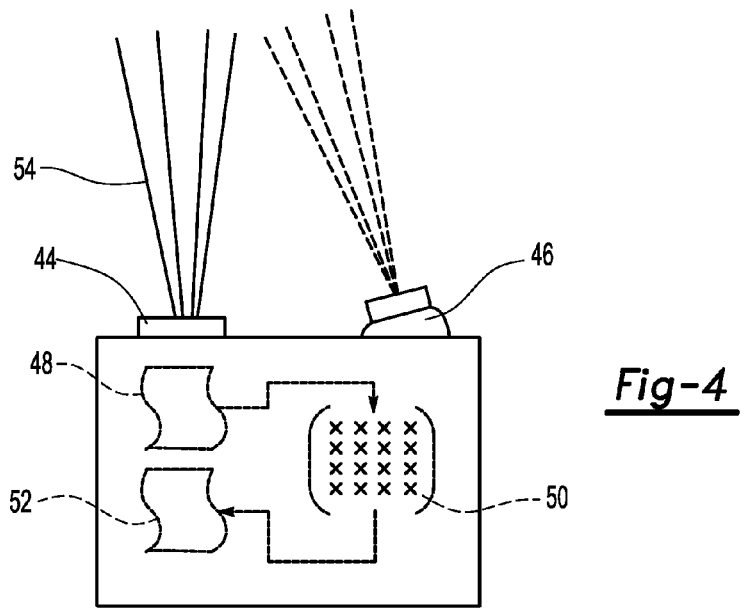
FIG. 4 further illustrates the embodiment of the method shown in FIG. 3.

As set forth above, in the Background and in my U.S. Pat. No. 5,646,859, the present commercial assembly laser projection systems include a laser projector 20 and a plurality (at least four) targets (typically retro-reflective targets) 22 at fixed locations relative to the work piece or work surface 24 as shown in FIG. 1. The laser projector 20 periodically scans the targets 22 to locate the position of the laser projector relative to the tool by a process of resection. The laser projector scanning mirrors can be calculated to trace a laser spot through the desired template pattern on the known three dimensional profile of the tool. This method, however, has several disadvantages, including that the projection of a template on the tool must be interrupted to confirm the relative position of the laser projector and the tool surface and it cannot correct for more dynamic changes or movement of the laser projector relative to the targets' surface.

One embodiment of the laser projection system of this invention shown in FIG. 2 includes a laser projector 26, a high resolution or high-definition camera 28 fixed relative to the laser projector 26 or integrated into the laser projector housing, as shown. Targets 30 are fixed relative to the work piece 32. In this embodiment, the laser projector 26 and the camera are used to establish the relative position between the fixed camera 28 location and the laser projector. Initially, the system locates the targets 30 using the laser projector 26 and the camera 28 to establish the relative correspondence between the fixed camera location and the projector system coordinate origin. This is achieved by scanning the targets when the system is stable or by compensating the laser targets' scanned position by monitoring the relative position between the camera during the interval between each target scanned. Once the relative correspondence between the laser and camera is established, the relative position of the laser projector 26 relative to the work tool 32 can be calculated based solely upon the camera position without any interruption of the displayed laser projection. Modifying the laser projection position based upon the updated camera location allows evaluation of a corrected projection list to maintain a fixed location for the optical template on the tool surface independent of the movement of the laser projector 26 or work tool 32. The preferred embodiment of the laser projection system shown in FIG. 2 provides two methods of updating the associated vector display list to allow for integration with existing laser projection systems and to provide for optimized performance with an enhanced projector developed to directly support the correction process.

FIG. 3 illustrates a laser and camera projection system using dynamic compensation to enhance an existing laser projection installation. In this configuration, an external camera 36 is physically attached to an existing laser projector 34. The camera 36 has an integrated LED flash 38 (discussed below with regard to FIG. 7) using a high-speed communication link (for example, an industrial camera model acA2500-14gm available from Basler AG communicates over Gigabite Ethernet to provide rapid transmission of high-speed resolution images positioned a remote distance from a host computer). Detected locations 42 can then be used to calculate the relative position of the laser projector 34. The host computer 40 can then calculate a relative scan vector offset based upon the 3-D extent of the currently projected template. The vector offset can be sent to the projector 34 and dynamically applied when tracing the currently stored vector display list to correct the motion of the projector relative to the target surface or tool (not shown). The system shown in FIG. 3 is not, however, optimal because the simple transformation of the vector display does not allow for complex dynamic motion relative to the tool and can only approximate the required correction to the displayed template. For example, components of the template significantly closer to the projector will require a larger correction in the vector angle for accurate compensation.

The enhanced projector design shown in FIG. 4 allows for more flexible performance. The embodiment of the projection system shown in FIG. 4 includes a laser projector 44 and a high-resolution camera 46. As shown, the vector display list 48 is augmented by recording the source 3-D coordinate of the displayed template. The embedded processor then dynamically applies the currently evaluated projector transform 50 to convert the vector display list 48 to a corrected vector display list 52 as the vector pattern is traced by the laser spot to provide a fully corrected template projection 54 in the presence of arbitrary relative motion. Image processing and calculation of the relative projection can occur in a host computer or preferably the camera 46 and image processing software to locate the retro-reflective targets and evaluate the camera pose are integrated directly into the projector.

To calculate the vector, which is the rotation angles of the two scanning mirrors of the laser projector (60 and 62 in FIG. 5), the position of the laser projector 44 relative to the work surface onto which the laser is projecting is first determined. Once the position of a projector relative to the work surface is determined, the computer calculates the necessary rotation of the scanning mirrors to change the projector position to the desired point at which the laser is to project onto the surface as discussed further below. Once the camera 46 is located relative to the work surface by observing the targets as discussed above, the location of the laser projector 44 is determined relative to the camera either by the known mechanical relationship or by a scanning requiring the position of the laser projector relative to the surfaces calculated. When the position of the laser projector relative to the surface is calculated, the position is used to determine the required mirror rotation vectors.

The host computer monitors changes in the calculated vectors from the initial calculated vectors and issues a correction to the mirror rotation angles shifting the projected pattern in a 2-D delta, and a second more advanced example, the correction is updated value of the 3-D coordinates as described further below.

Figure 5:
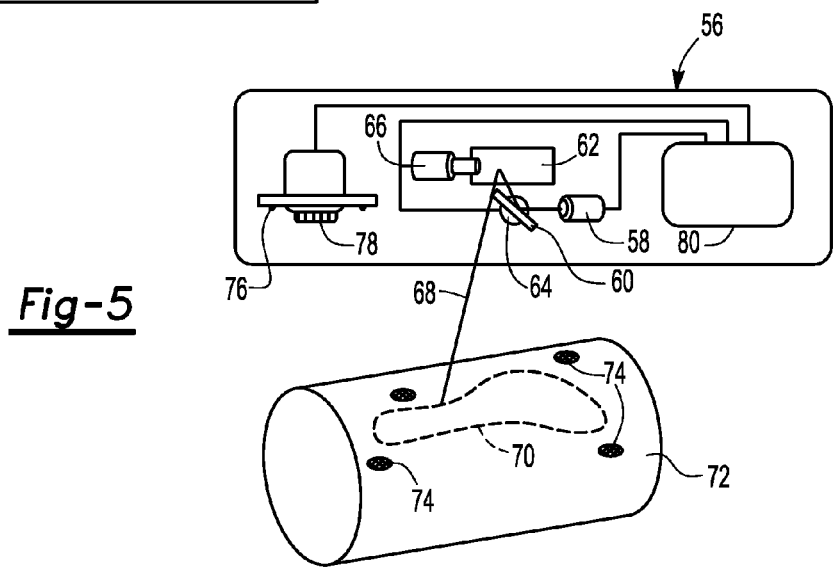
FIG. 5 illustrates the method of this invention including one preferred embodiment of a laser projector.

FIG. 5 illustrates a laser projector and camera assembly 56 suitable for the method of accurately projecting a laser image pattern on a work surface of this invention. The assembly includes a laser or source of a laser 58, rotational mirrors 60, 62 each mounted on a rotational galvanometer motor 64, 66. The laser beam 68 is redirected by the rotating galvanometer mirrors 60, 62 that deflect the laser beam onto a cylindrical work piece 72 tracing a pattern 70 on the work piece. The work piece includes at least four targets 74, preferably retro-reflective targets at predetermined locations on the cylindrical work piece 72. As will be understood, the work surface 72, may have any shape and is not limited to cylindrical. The assembly further includes a high-definition camera 78 and the targets 74 are illuminated by a light source 76, preferably LED light sources or LED strobe array 76. A processing board 80 detects the target locations and the camera in the image of the camera 78 to calculate the relative position of the projector with respect to the target 72 and determines the modified mirror deflections necessary to trace the pattern in a constant location on the part irrespective of any movement of the projector relative to the target's surface due to the movement of the target 72, the projector or both. Thus, the camera 78 continuously updates the location of the assembly 56 relative to the work piece 72 without interruption of the laser projection. In one preferred embodiment, the computer continuously adjusts the rotation of the laser projection mirrors 60 and 62 by controlling the rotational galvanometer motors 64, 66 in response to dynamic movement of the laser projector relative to the work surface as determined by the camera 78. The computer may be used to continuously track at least two prior locations of the laser projector 78 relative to the work surface 72 and predict the next location of the laser projector compensating for relative movement of the laser projector and the work surface 72. The method of this invention may also be utilized to compensate for acceleration (i.e., changes in velocity) of the laser projector 58 relative to the work surface 72 by continuously tracking at least three prior locations of the laser projector 58 relative to the work surface in three dimension and predict the next location of the laser projector and compensate it for movement of the laser projector relative to the work surface. The method of this invention may also be utilized to track the acceleration (change in velocity) of the laser projector or laser projector and camera assembly 56 relative to the work surface 72. As will be understood by those skilled in this art, the laser projector and camera assembly 56 is typically mounted on an overhead crane, beam or gantry and is thus subject to erratic movement due to wind or ground movement. Similarly, the work piece 72 may be moveable relative to the laser projector. In certain applications, where accuracy is critical, such as aircraft carbon fiber layup used in construction of certain aircraft, the error in the laser projection must be less than 0.5 mm or 0.01968 inches. This accuracy may be achieved with the method of this invention even under dynamic conditions.

Figure 6:
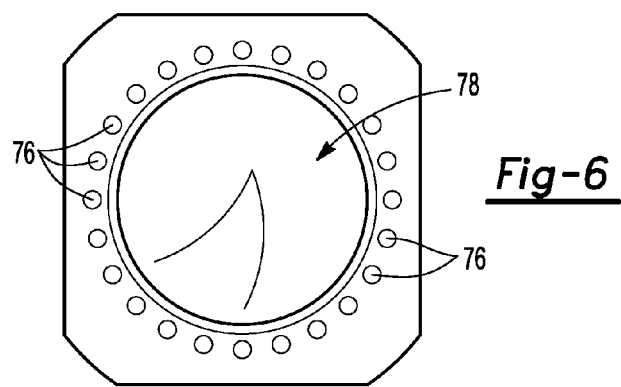
FIG. 6 is an end view one embodiment of the camera, illustrating a further embodiment of the method of this invention.

FIG. 6 is an end view of the camera 78 shown in FIG. 5 (and FIG. 3), wherein the camera 78 is surrounded by an LED strobe array 76. As set forth above, the LED strobe array 76 lights the retro-reflective targets 74 in FIG. 5 which are viewed by the camera 78 improving the accuracy of the measurement or determination of the relative position of the camera and laser projector relative to the work surface.

As will be understood by those skilled in this art, various modifications may be made to the embodiments of the method of projecting laser image pattern on a work surface of this invention within the purview of the appended claims. For example only, two or more cameras may be utilized in the method of this invention and the cameras may be fixed relative to the laser projector by any means, including locating the camera within the housing of the laser projector as shown in FIG. 5 or spacing the camera from the laser projector with a bracket or bar. Having described the method of this invention, the method is now claimed, as follows.

The invention claimed is:

1. A method of accurately projecting a laser image pattern on a work surface and continuously compensating for relative arbitrary dynamic movement between the laser projector and the work surface with a laser projector and camera system including at least one laser projector having a source of a laser beam and rotating mirrors redirecting the laser beam onto the work surface, at least one high resolution camera fixed relative to the laser projector, targets at fixed locations relative to the work surface and a computer communicating with the laser projector and the camera, said method comprising:
    establishing a position of the camera relative to the work surface in a three dimensional coordinate system by locating the targets in the camera image;
    establishing a position of the laser projector relative to the work surface utilizing the fixed position of the laser projector relative to the camera; and
    using the computer to continuously adjust the rotation of the laser projector mirrors in response to arbitrary dynamic movement of the of the laser projector relative to the work surface in the three dimensional coordinate system as determined by the camera, continuously correcting the location of the laser beam in three dimensions by stretching the two dimensional laser projection to correct for the effects of changes in 3D perspective of the work surface in response to arbitrary relative movement between the laser projector and the work surface.

2. The method as defined in claim 1, wherein the computer continuously tracks at least two prior locations of the laser projector relative to the work surface in three dimensions and predicts a next location of the laser projection compensating for the movement of the laser projector relative to the work surface.

3. The method as defined in claim 1, wherein the method includes establishing the position of the camera relative to the laser projector by scanning the targets with the laser projector and locating the targets with the camera when the laser projector is stable relative to the targets.

4. The method as defined in claim 1, wherein the targets are retro-reflective targets and the system includes a light flash assembly directed toward the retro-reflective targets, the method including directing the light flashes toward the retro-reflective targets, and locating the lighted retro-reflective targets with the camera to accurately locate the retro-reflective targets and the target surface.

5. The method as defined in claim 4, wherein the camera includes an LED strobe array and the method includes directing the LED strobe array onto the work surface and the camera accurately establishing the position of the camera relative to the work surface in three dimensions by locating the lighted retro-reflective targets within the camera image.

6. The method as defined in claim 1, wherein the position of the camera relative to the laser projector is established by scanning the targets with the laser projector and individually compensating each scan by simultaneously locating the laser projector with the camera.

7. The method as defined in claim 1, wherein the targets at fixed locations relative to the target surface each emit a source of light, the method including imaging the lighted targets with the camera and locating the laser projector with the camera.

8. The method as defined in claim 1, wherein the position of the laser projector relative to the work surface is utilized by the computer to convert three dimensional pattern coordinates to project vector mirror deflection coordinates in the laser projector as the corrected laser pattern is traced on the work surface.

9. The method as defined in claim 1, wherein the method includes accurately establishing the position of the camera relative to the laser projector by directly observing with the camera an element of the laser projector.

10. The method as defined in claim 9, wherein the element of the laser projector observed by the camera is a spot projected by the laser projector and the method includes observing with the camera a spot projected by the laser projector and calculating the position of the camera relative to the projector with the computer.

11. The method as defined in claim 10, wherein the method includes determining the position of the camera relative to the laser projector by observing with the camera a spot projected by the laser projector on the work surface.

12. A method of accurately projecting a laser image pattern on a work surface and continuously compensating for relative arbitrary dynamic movement between the laser projector and the work surface with a laser projector and camera system including at least one laser projector having a source of a laser beam and rotating mirrors redirecting the laser beam onto the work surface to generate a three dimensional template, at least one high resolution camera fixed relative to the laser projector, a plurality of retro-reflective targets at fixed locations relative to the work surface and a computer communicating with the laser projector and the camera, said method comprising:
    directing a flashing light source onto the retro-reflective targets;
    establishing a position of the camera relative to the work surface in a three dimensional coordinate system by locating the lighted retro-reflective targets in the camera image;
    establishing a position of the laser projector relative to the work surface in the three dimensional coordinate system utilizing the fixed position of the laser projector relative to the camera; and
    modifying the three dimensional template projected by the laser projector by predicting a next location of the laser projector relative to the work surface based upon prior locations of the laser projector relative to the work surface to compensate for a calculated position of the laser projector relative to the work surface, when one of the laser projector and the work surface are subject to arbitrary dynamic movement.

13. The method as defined in claim 12, wherein the camera includes an LED strobe array and the method includes directing the LED strobe array onto the work surface, imaging the lighted retro-reflective targets with the camera and accurately establishing the position of the laser projector relative to the work surface in three dimensions by locating the lighted retro-reflective targets within the camera image.

14. The method as defined in claim 12, wherein the method includes using the computer to continuously adjust the rotation of the laser projector mirrors in response to arbitrary dynamic movement of the laser projector relative to the work surface as determined by the camera, continuously correcting the location of the laser beam on the work surface.

15. The method as defined in claim 14, wherein the computer continuously tracks at least two prior locations of the laser projector relative to the work surface in three dimensions and predicts the next location of the laser projector compensating for the movement of the laser projector relative to the work surface.

\* \* \* \* \*